(12) United States Patent
Chiu et al.

(10) Patent No.: US 6,576,162 B2
(45) Date of Patent: Jun. 10, 2003

(54) METHOD FOR INJECTION MOLDING OF WELD LINE FREE THERMOPLASTIC ARTICLES SUCH AS OPHTHALMIC LENSES

(75) Inventors: Hao-Wen Chiu, Clearwater, FL (US); Hsinjin Edwin Yang, Palm Harbor, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 129 days.

(21) Appl. No.: 09/846,118

(22) Filed: Apr. 30, 2001

(65) Prior Publication Data

US 2003/0025226 A1 Feb. 6, 2003

(51) Int. Cl.$^7$ .......................... B29C 45/17; B29D 11/00
(52) U.S. Cl. ................ 264/1.1; 264/328.1; 264/328.12; 264/338; 425/808
(58) Field of Search .............................. 264/1.1, 328.1, 264/328.12, 337, 338; 425/808; 249/114.1, 116

(56) References Cited

U.S. PATENT DOCUMENTS

| | | | |
|---|---|---|---|
| 2,292,917 A | 8/1942 | Williams ................. | 18/34 |
| 4,364,378 A | 12/1982 | Seuss et al. ............... | 128/24.5 |
| 4,364,878 A | 12/1982 | Laliberte et al. ............ | 264/2.2 |
| 4,540,534 A | * 9/1985 | Grendol ................... | 264/2.2 |
| 4,560,342 A | 12/1985 | Ishida et al. .............. | 425/562 |
| 4,793,953 A | 12/1988 | Maus ..................... | 264/2.5 |
| 6,019,930 A | 2/2000 | Baresich .................. | 264/327 |

FOREIGN PATENT DOCUMENTS

| | | |
|---|---|---|
| JP | 7227854 | 8/1995 |
| JP | 7266343 | 10/1995 |
| JP | 2000127175 | 5/2000 |
| WO | WO 89/10829 | 11/1989 |

OTHER PUBLICATIONS

Hukseflux Thermal Sensors: Thermal Conductivity Science. (undated) Available at www.hukseflux.com/thermal%20conductivity/thermal.htm.*
Chemfinder.com data sheet for Aluminum Oxide. (undated) Available at chemfinder.cambridesoft.com.*

* cited by examiner

Primary Examiner—James P. Mackey
Assistant Examiner—Donald Heckenberg
(74) Attorney, Agent, or Firm—Fulbright & Jaworski LLP

(57) ABSTRACT

Disclosed is an injection molding method. The method comprises injecting a melt of thermoplastic material at a temperature higher than the glass transition temperature ($T_g$) of the thermoplastic material in a molding cavity defined by a two-piece mold insert. The article is recovered after cooling and disassembling of the two piece mold insert. Each of the two pieces of the mold insert comprise at least one portion partly defining the mold cavity which is made of a material or combination of materials, other than glass, the thermal diffusivity $\alpha$ of which fulfills the condition: $1 < \alpha/\alpha_g < 11$, wherein $\alpha_g$ is the thermal diffusivity of a borosilicate glass and is equal to $6.20 \times 10^{-7}$ m$^2$ s$^{-1}$. The portion is at least 1 mm thick. The injection molding method can be used to form weld free minus lenses.

25 Claims, 1 Drawing Sheet

METHOD FOR INJECTION MOLDING OF WELD LINE FREE THERMOPLASTIC ARTICLES SUCH AS OPHTHALMIC LENSES

BACKGROUND OF THE INVENTION

The present invention relates to a method and a mold for injection molding of thermoplastic material articles, especially polycarbonate (PC) articles and the use of such a method and mold to obtain injection molded optical lenses and in particular minus lenses free of weld lines.

Typically, thermoplastic optical lenses are made by injection molding of a thermoplastic material in a molding cavity defined by the internal surface of a two-piece mold insert.

In injection molding of thermoplastic materials, weld lines are formed whenever advancing melt fronts meet, which may originate from multiple gate filling to leading to head-on impingement of separate flow fronts or splitting and converging of flow fronts due to presence of insert. Weld lines are important not only because they form visual defects such as lines, notches or color changes on the surface of the molded part, but also because they generally represent weak regions due to the difference in molecular orientation across the weld regions.

In the case of injection molding of optical lenses, a thermoplastic material melt, at a temperature above the glass transition temperature ($T_g$) of the thermoplastic material, is injected in the mold cavity. The flow fronts then wrap around the edge of the mold cavity and then rejoin at the end of the cavity, forming a weld line. This problem of weld line formation occurs predominantly when molding minus lenses.

The strength of the weld line may be characterized by a weld line strength factor, which is defined as the ratio of the composite strength in the presence of a weld line to that of the same composite without weld lines.

Generally speaking, the weld line strength factor can be enhanced by increasing injection pressure, speed, and melt temperature or by locating weld lines closer to a gate to get enough packing. Also, providing venting at the weld region helps as the resistance to packing flow is reduced. However, none of these practices can eliminate weld lines completely. In ophthalmic lens application, presence of weld lines is simply unacceptable due to the resulting cosmetic defects and sometimes power variations.

Several kinds of mold inserts are known in the art for molding optical lenses.

One kind of mold insert which is used is a glass mold insert.

Other kinds of mold inserts are also described in the prior art.

Thus, U.S. Pat. No. 4,793,953 describes a die comprising a base material of Beryllium-Copper alloy having high heat transfer rate with a thick plating film of chromium or nickel giving desirable surface properties. The film is however very thin (up to about 380 micrometers). In this document it is indicated that optical mold made of electroformed metal (usually nickel) of thickness up to about 0.4 cm are known in the art and are preferably used instead of glass molds because their surfaces have an increased transfer rate, which is indicated as desirable for use in high pressure thermoplastic molding processes. It is also mentioned, that there have been previous attempts to combine, in a two-piece mold insert, metal materials of dissimilarly high and low thermal conductivities, to produce optical lens injection molds for thermoplastic materials. Reference is made to U.S. Pat. No. 2,292,917 which discloses a two piece mold insert with a steel die joined with a back body formed of a material having a thermal conductivity considerably higher than that of the material of the dies.

U.S. Pat. No. 4,364,378 describes a two-piece mold insert with a conductive plug made of a material of lower thermal conductivity than the remainder of the insert and allowing obtention of a higher heat transfer rate at the peripheral portion of the mold than in the center of the mold.

Document JP 07266343 describes the use of a metal mold with an inner surface coated with a thermal insulation layer of a polymer having a thermal conductivity of 0.002 cal/cm.s.° C., and having a thickness of 0.01 to 2 mm, this thermal insulation layer having fine rugged surface. Due to the fine rugged surface, this mold is not suitable for molding optical lenses.

Nevertheless, the weld line formation problem still remains when using these prior art molds.

U.S. Pat. No. 4,364,878 describes an apparatus and a method for molding precisely shaped articles such as ophthalmic lenses, and in particular minus lenses, from synthetic resin. In order to solve the weld line problem, it is proposed in U.S. Pat. No. 4,364,878 a method which comprises moving the insert pieces to their relatively remote position to form a cavity of a volume greater than that of the finished lens, injecting into the cavity at a relatively low pressure a parison mass of the resin equal to the mass required to form the finished product and applying pressure to the insert pieces to bring their optical surfaces into engagement with the mass to coin the mass to fill completely the space between the insert pieces, and controllably cooling the viscous mass while under pressure so that all parts thereof cool to the glass transition temperature at substantially the same time. This process, which necessitates moving the insert pieces is complex and requires a sophisticated molding machine.

U.S. Pat. No. 4,560,342 also discloses a method for molding weld line free concave lenses using a metallic insert. The above goal is reached according to U.S. Pat. No. 4,560,342 by firstly feeding the molten resin material through a feeding mouth into an intermediate thin portion of the mold cavity, while permitting hot water to circulate to maintain a high mold temperature and thereafter moving the feeding mouth to a thick portion of the mold cavity, and continuously feeding with molten resin. The implementation of such a method necessitates a complex device, in particular for moving the molten resin feeding mouth.

SUMMARY OF THE INVENTION

One object of the present invention is to provide a method and mold for molding thermoplastic articles, such as ophthalmic lenses and in particular minus ophthalmic lenses, free of weld line.

An other object of the present invention is to provide a method and a mold as defined above which result in shorter molding cycles.

In general, the invention contemplates a method for injection molding a weld line free thermoplastic material article which comprises:

injecting a melt of a thermoplastic material at a temperature higher than the glass transition temperature ($T_g$) of the thermoplastic material in a molding cavity defined by a two piece mold insert, and after cooling and disassembling of the two piece mold insert, recovering the molded article, wherein each of the two-pieces of the mold insert comprises at least one portion partly defining said mold cavity which is made of a material or a combination of materials, other than glass the thermal diffusivity α of which fulfills the condition $$1 < \alpha/\alpha_g < 11$$

where $\alpha_g$ is the thermal diffusivity of a borosilicate crown glass and is equal to 6.20E-7 m² s⁻1, said portion having a thickness of at least 1 mm.

The invention also contemplates a two-piece mold insert for use in a mold for molding of a weld line free thermoplastic material article, wherein at least a portion of said insert is as defined above in connection with the injection molding method.

Preferably, the material constituting the portion of the pieces of the insert is a metallic material.

BRIEF DESCRIPTION OF THE DRAWINGS

In the accompanying drawings to which reference is made in the instant specification and in which like reference characters are used to indicate like parts in the various views.

DETAILED DESCRIPTION OF THE PREFERRED EMBODIMENT

Figure 1:
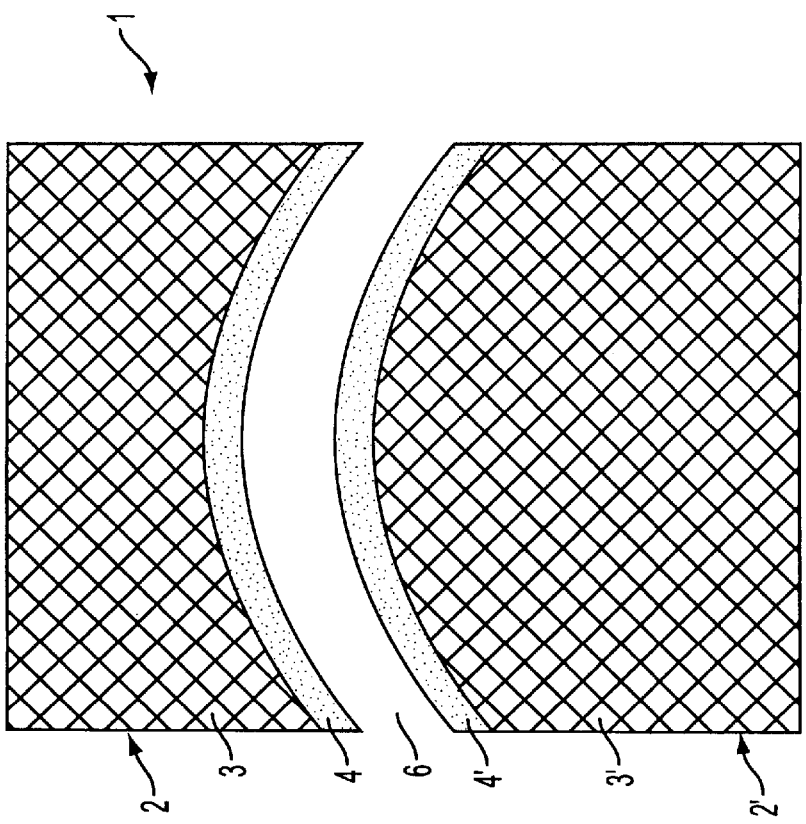
FIG. 1 is a schematic representation of one embodiment of a two-piece mold insert according to the invention.

Referring to FIG. 1, there is represented one embodiment of a two-piece mold insert 1 suitable for carrying out the injection molding method according to the present invention.

As is classical, the insert 1 comprises two separable pieces 2, 2'. Each of the pieces 2, 2' of the insert comprises a base or substrate 3, 3' to which is bonded a layer 4, 4', the internal surface of which partly defines a mold cavity 6. When the two pieces 2, 2' of the insert 1 are assembled, the internal surfaces of layers 4, 4' define the mold cavity 6.

As is known, the thermal diffusivity α of a material is defined as the ratio of heat dissipation and energy storage of the material, and is expressed by formula:

$$\alpha = K/\rho C_p$$

wherein K(W/m.K) is the thermal conductivity, ρ (kg/m³) is the density and $C_p$ (J/kg.K) is the specific heat of the material.

According to the invention layers 4 and 4' are made of a material which as a thermal diffusivity α such as $\alpha/\alpha_g$ is superior to 1 and inferior to 11, where $\alpha_g$ is the thermal diffusivity of a borosilicate crown glass, equal to 6.20 E7(m² s–1).

Preferably, the $\alpha/\alpha_g$ ratio is inferior to 10 and more preferably ranges from 2 to 6. The preferred material for layers 4 and 4' are Ti-alloys or Ni-alloys.

Among the Ti-alloys there may be cited Ti-6Al-4V, Ti-8Al-1Mo-1V, Ti-4Al-10Cr-14V and Ti-2Al-5Zr-11Sn. The preferred titanium alloys are Ti-6Al-4V and Ti-8Al-1 Mo-1V.

Among the Ni-alloys suitable for making the layers 4 and 4' there may be cited the alloys commercialized under the trade-names of HASTELLOY®, INCONEL® and INVAR®. The thermal diffusivity as well as the $\alpha/\alpha_g$ ratio of some of these alloys and other materials are reported in table I below:

TABLE I

Thermal properties of insert materials

|  | ρ(kg/cm³) | Cp(J/kg-K) | K(W/m-K) | α (m²s⁻¹) | $\alpha/\alpha_g$ |
|---|---|---|---|---|---|
| glass, borosilicate crown | 2520 | 669.4 | 1.046 | 6.20E-07 | 1 |
| beryllium copper (Cu bal/0.38–0.55 Be) | 8750 | 397.5 | 220.08 | 6.33E-05 | 102.045 |
| beryllium copper (Cu bal./1.7–1.9 Be) | 8260 | 397.5 | 108.78 | 3.31E-05 | 53.430 |
| chromium | 7160 | 447.7 | 87.864 | 2.74E-05 | 44.204 |
| nickel alloy hastelloy r-235 | 8220 | 439.3 | 9.2048 | 2.55-06 | 4.111 |
| nickel alloy invar (hot-rolled or frgd) | 8000 | 514.6 | 10.878 | 2.64E-06 | 4.261 |
| steel, stainless 420 | 7800 | 460 | 24.9 | 6.94E-06 | 11.193 |
| titanium | 4500 | 523 | 20.92 | 8.89E-06 | 14.335 |
| titanium alloy (Ti-6Al-4V) | 4450 | 523 | 7.1128 | 3.06E-06 | 4.929 |
| titanium alloy (Ti-8Al-1Mo-1V) | 4370 | 543.9 | 5.8576 | 2.46E-06 | 3.974 |
| titanium alloy (Ti-4Al-14V-10Cr) | 5100 | 527.2 | 7.9496 | 2.96E-06 | 4.768 |
| titanium alloy imi 679 (Ti-2Al-5Zr-11Sn) | 4840 | 481.2 | 6.6944 | 2.87E-06 | 4.635 |

The thickness of layers 4 and 4' is generally of at least 1 mm, preferably at least 2 mm and more preferably at least 3 mm.

As shown in FIG. 1 the two piece inserts of the invention can be a composite insert in which each of the two pieces 2, 2' comprises a base (or substrate) 3, 3' bonded via an adhesive layer (not shown) to a layer 4, 4' as defined above; the surfaces of the layers 4, 4' form the optical molding surface defining the mold cavity 6. The bases 3, 3' may be made of any suitable material. The materials mentioned in table I above are suitable for forming the bases 3, 3' of the insert pieces 2, 2'. Among the preferred material for the bases 3, 3', there may be cited steel and alloys such as beryllium-copper alloys. The bases 3, 3' can also be composite bases including layers of different materials, in particular a metallic layer such as a steel or a glass layer. Usually the material of the bases 3, 3' of the composite insert has a thermal diffusivity $\alpha_b$ such that the ratio $\alpha_b/\alpha_g$ is higher than 1, and more preferably the base material will have a thermal diffusivity $\alpha_b$ higher than that of the material of the layers 4, 4'.

Layers 4, and 4' may be bonded to bases 3, 3' using any appropriate adhesive, but preferably an epoxide adhesive.

In general, the whole thickness of the composite inserts will range from 3 to 5 cm.

Figure 2:
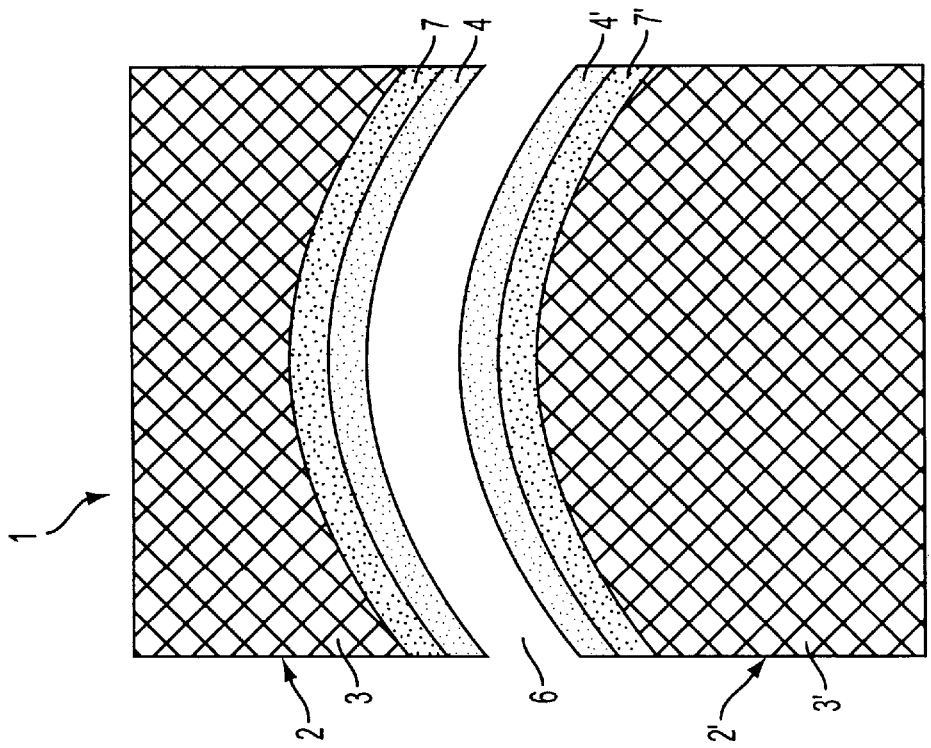
FIG. 2 is a schematic representation of another embodiment of a two-piece mold insert according to the invention.

In FIG. 2 there is represented schematically another embodiment of a composite two-piece insert 1 according to the invention. This composite two-piece insert 1 is similar to the composite insert shown in FIG. 1 except that an intermediate layer 7, 7' of borosilicate crown glass having a thickness of 1 mm or more is disposed between the bases 3, 3', for exemple made of steel and the layers 4, 4' made of Ti or Ni-alloy having a thermal diffusivity satisfying the above condition. Intermediate layer 7, 7' and the layers 4, 4' are respectively bonded to the bases 3, 3' and the intermediate layers 7, 7' through adhesive layers (not shown), such as epoxide adhesive layers. The glass of the intermediate layer 7, 7' can be borosilicate crown glass.

Of course the two pieces of the insert may also be monolithic. In this case, the material constituting the whole insert piece will be a single material having a diffusivity α verifying the above condition.

As is well known in the art the surfaces of the insert pieces 2, 2' defining the mold cavity 6 may be coated with one or several thin coatings for enhancing the surface properties and the optical quality of the insert pieces 2, 2', such as for example a thin chromium or titanium coating for example CrN, TiN, TiC.

Generally such additional property enhancing coating has a thickness of less than 100 μm, preferably less than 10 μm and more preferably less than 1 μm.

Due to the choice of the materials constituting the pieces of the insert (composite or monolithic), the temperature at the interface between the thermoplastic material melt and the insert whithin the mold cavity is maintained above $T_g$ of the thermoplastic material during at least one second and preferably during 2 to 5 seconds, after the thermoplastic material melt came into contact with the surface of the insert.

As previously indicated any thermoplastic material can be used with the process of the invention, however the preferred thermoplastic material is polycarbonate.

The process of the invention is particularly suitable for injection molding ophthalmic lenses and in particular minus ophthalmic lenses such as minus single vision ophthalmic lenses.

As mentioned previously, the method of the invention allows to obtain lenses having good optical performances, in particular no weld lines, short injection cycles and there is no breakage of the mold inserts contrary to monolithic glass mold inserts.

The following examples illustrate the present invention

Example 1

Two sets of −2.00/0.00 and two sets of −4.00/0.00 titanium-alloy inserts were made. The titanium alloy used was Ti-6Al-4V. Each piece of the two-piece inserts was 4.445 cm (1.75 inch) long. These inserts were used for molding 1.5 mm thick, 76 mm round, −2.00/0.00 and −4.00/0.00 polycarbonate lenses using a 110 ton Roboshot apparatus equipped with a two-cavity, cold runner mold. The corresponding processing conditions are listed in tables II and III below. Due to the higher aspect ratio of the −4.00/0.00 lenses, pre-injection (simulated coining) instead of straight injection is required. With Ti-6Al4V inserts, the cycle time for molding −2.00/0.00 lenses is about 150 seconds which is 30 seconds shorter than the over 3 minutes cycle time in production using glass inserts. Similarly, the 4.00/0.00 Ti-alloy inserts achieved a 25% reduction in cycle time (180 second compared to the over 4 minutes using glass inserts).

Coating of the resulting lenses with a silicone hard coat shows that the lenses were weld line free.

Properties of the resulting lenses are given in tables IV and V.

TABLE II

Process conditions for injection molding −2.00/00 lenses with Ti-Al6-V4 inserts

| | |
|---|---|
| Melt Temperature (° F.) | 600° F. |
| (° C.) | 315° C. |
| Mold Temperature (° F.) | (275) |
| (° C.) | (135) |
| Injection Steps | 3.81 cm/s (1.5 ips) |

TABLE III

Process conditions for injection −4.00/0.00 lenses with Ti-Al6-V4 inserts

| | |
|---|---|
| Melt Temperature (° F.) | 600° F. |
| (° C.) | 315° C. |
| Mold Temperature (° F.) | (275) |
| (° C.) | (135) |
| Injection Steps | 3.556 cm/s (1.4 ips) |

Polycarbonate was a General Electric Company production grade PC resin dried at 121° C. (250° F.) for 4 hours.

TABLEAU IV

QA inspection report for −2.00/00 lenses molded with Ti-Al6-V4 inserts

| nom. power | 1 | 2 | 3 |
|---|---|---|---|
| | −2.00–0 | −2.00–0 | −2.00–0 |
| actual power | −1.97–0 | −1.99–0 | −1.99–0 |
| 0.08 | | | |
| 0.12 | | | |
| thickness (mm) | 1.67 | 1.66 | 1.67 |
| 1.3–1.7 | | | |
| 1.3–1.8 | | | |
| cosmetics | | NO WELD LINE | |
| coating: | OK | OK | OK |
| drip: 3 mm | | | |

TABLEAU V

QA inspection report for −4.00/00 lenses molded with Ti-Al6-V4 inserts

| nom. power | 1 | 2 | 3 |
|---|---|---|---|
| | −4.00–0 | −4.00–0 | −4.00–0 |
| actual power | −4.11–0 | −4.07–0 | −4.10–0 |
| 0.08 | | | |
| 0.12 | | | |
| thickness | 1.61 | 1.63 | 1.60 |
| 1.3–1.7 | | | |
| 1.3–1.8 | | | |
| cosmetics | | NO WELD LINES | |
| coating of a | SS | OK | OK |
| silicone hard | | | |
| coating | | | |

What is claimed is:

1. A method for injection molding of a weld line free thermoplastic material article, which comprises:

injecting a melt of thermoplastic material at a temperature higher than the glass transition temperature ($T_g$) of the thermoplastic material in a molding cavity defined by a two-piece mold insert; and after cooling and disassembling of the two piece mold insert, recovering the molded article;

wherein, each of the two pieces of the mold insert comprises at least one portion partly defining the molding cavity which is made of a material or a combination of materials, other than glass, the thermal diffusivity α of which fulfills the condition:

$$1 < \alpha/\alpha_g < 11$$

where $\alpha_g$ is the thermal diffusivity of a borosilicate crown glass and is equal to 6.20 E-7 m² s⁻¹, said portion being at least 1 mm thick.

2. The method of claim 1, wherein the ratio $\alpha/\alpha_g$ is lower than 10.

3. The method of claim 1, wherein $2 < \alpha/\alpha_g \leq 6$.

4. The method of claim 1, wherein said portion is at least 2 mm thick.

5. The method of claim 1, wherein said portion is at least 3 mm thick.

6. The method of claim 1, wherein a temperature higher than the $T_g$ of the thermoplastic material is maintained at the interface between the melt and the insert for at least 1 second after the melt came into contact with the insert.

7. The method of claim 1, wherein a temperature higher than the $T_g$ of the thermoplastic material is maintained at the interface between the melt and the insert for 2 to 5 seconds after the thermoplastic material melt came into contact with the insert.

8. The method of claim 7, wherein said portion of the insert pieces is made of a Ti-alloy or a Ni-alloy.

9. The method of claim 8, wherein the Ti-alloy is selected from the group consisting of Ti-6Al-4V, Ti-8Al-1Mo-1V, Ti-4Al-10Cr-14V and Ti-12Al-5Zr-11Sn.

10. The method of claim 1, wherein the insert is a monolithic insert in which the insert pieces are entirely made of a material whose thermal diffusivity α fulfills the condition of claim 1.

11. The method of claim 1, wherein the insert is a composite insert in which the said portion of each of the two pieces is in the form of a layer bonded to a base.

12. The method of claim 11, wherein the base is made of a material having a thermal diffusivity $\alpha_b$ fulfilling the condition:

$$\alpha_b/\alpha_g > 1.$$

13. The method of claim 12, wherein thermal diffusivity $\alpha_b$ of the base material is higher than the thermal diffusivity α of the material of the layer.

14. The method of claim 11, wherein the base material is selected from the group consisting of glass, steel, chromium, titanium, copper beryllium alloys, titanium-alloys and nickel-alloys.

15. The method of claim 11, wherein the layer is bonded to the base through an adhesive intermediate layer.

16. The method of claim 15, wherein the adhesive layer is an epoxide adhesive layer.

17. The method of claim 1, wherein each of the two pieces of the insert is surface coated with a surface property enhancing thin film.

18. The method of claim 17, wherein said film is less than 100 µm thick.

19. The method of claim 17, wherein said film is less than 10 µm thick.

20. The method of claim 17, wherein said film is less than 1 µm thick.

21. The method of claim 17, wherein said film comprises a chromium or titanium compound.

22. The method of claim 1, wherein the thermoplastic material is a polycarbonate.

23. The method of claim 1, wherein the article is an ophthalmic lens.

24. The method of claim 23, wherein the ophthalmic lens is a minus lens.

25. The method of claim 24, wherein the minus lens is a finished single vision lens.

* * * * *

UNITED STATES PATENT AND TRADEMARK OFFICE
CERTIFICATE OF CORRECTION

PATENT NO.    : 6,576,162 B2
DATED         : June 10, 2003
INVENTOR(S)   : Chiu et al.

It is certified that error appears in the above-identified patent and that said Letters Patent is hereby corrected as shown below:

<u>Column 7,</u>
Line 11, delete "$2 < \alpha/\alpha_g \leqq 6$" and insert -- $2 \leq \alpha/\alpha_g \leq 6$ -- therefor.

Signed and Sealed this

Fourteenth Day of October, 2003

JAMES E. ROGAN
*Director of the United States Patent and Trademark Office*